(12) United States Patent
Graiger et al.

(10) Patent No.: US 7,403,837 B2
(45) Date of Patent: Jul. 22, 2008

(54) PORTABLE DEVICE USED TO AT LEAST VISUALIZE THE PROCESS DATA OF A MACHINE, A ROBOT OR A TECHNICAL PROCESS

(75) Inventors: Dieter Graiger, Pasching (AT); Hans-Peter Wintersteiger, Hagenberg (AT); Martin Danner, Gallneukirchen (AT)

(73) Assignee: KEBA AG, Linz (AT)

( * ) Notice: Subject to any disclaimer, the term of this patent is extended or adjusted under 35 U.S.C. 154(b) by 749 days.

(21) Appl. No.: 10/480,851

(22) PCT Filed: Jun. 20, 2002

(86) PCT No.: PCT/AT02/00179

§ 371 (c)(1),
(2), (4) Date: Jun. 16, 2004

(87) PCT Pub. No.: WO03/001393

PCT Pub. Date: Jan. 3, 2003

(65) Prior Publication Data

US 2004/0248619 A1    Dec. 9, 2004

(30) Foreign Application Priority Data

Jun. 26, 2001  (AT)  ................ A 979/2001

(51) Int. Cl.
*G05B 19/00*  (2006.01)

(52) U.S. Cl. ............... 700/264; 700/245; 700/256; 361/71; 361/72; 361/73; 361/74; 361/75; 714/15; 714/24; 901/3

(58) Field of Classification Search ............ 700/245, 700/256, 264; 361/71, 72, 73, 74, 75; 714/15, 714/24; 901/3
See application file for complete search history.

(56) References Cited

U.S. PATENT DOCUMENTS 5,937,143 A    8/1999    Watanabe et al.

(Continued)

FOREIGN PATENT DOCUMENTS

DE    297 11 589 U    9/1997

(Continued)

*Primary Examiner*—Thomas Black
*Assistant Examiner*—McDieunel Marc
(74) *Attorney, Agent, or Firm*—Collard & Roe, P.C.

(57) ABSTRACT

A portable device (1) with at least one optical output device (2) for displaying at least process data of a machine, a robot or a technical process, with at least one input device (3) for at least intervening in the operating functions of the device (1) and/or for operating the machine or robot or technical process, and having a safety switch device (12) for preventing the output of undesirable, unintended control commands for the machine, robot or technical process. The output devices (2) and input devices (3) are connected to a control device (14), which is accommodated in a housing (7) that is unbreakable as far as possible and at least one communication interface (17) is provided to an external control device disposed at a distance away. Several of the input and output devices (2, 3) are functionally combined by means of a touch-sensitive screen (4) in the form of a touch-screen (5) and the touch-sensitive screen (4) extends across substantial regions of the surface of the housing (7).

43 Claims, 6 Drawing Sheets

U.S. PATENT DOCUMENTS

| | | |
|---|---|---|
| 6,144,550 A | 11/2000 | Weber et al. |
| 6,236,399 B1 | 5/2001 | Nishiyama et al. |
| 6,356,806 B1 * | 3/2002 | Grob et al. .................. 700/245 |
| 6,836,700 B2 * | 12/2004 | Greene et al. ............... 700/245 |

FOREIGN PATENT DOCUMENTS

| | | | |
|---|---|---|---|
| DE | 100 23 199 A1 | 1/2001 |
| EP | 0 303 708 A | 2/1989 |
| EP | 1011035 A | 6/2000 |
| JP | 05324037 A | 12/1993 |
| JP | 11242515 A | 9/1999 |
| JP | 2001088069 A | 4/2001 |
| WO | WO 97 04369 A | 2/1997 |
| WO | WO 9000273 A | 1/1999 |

* cited by examiner

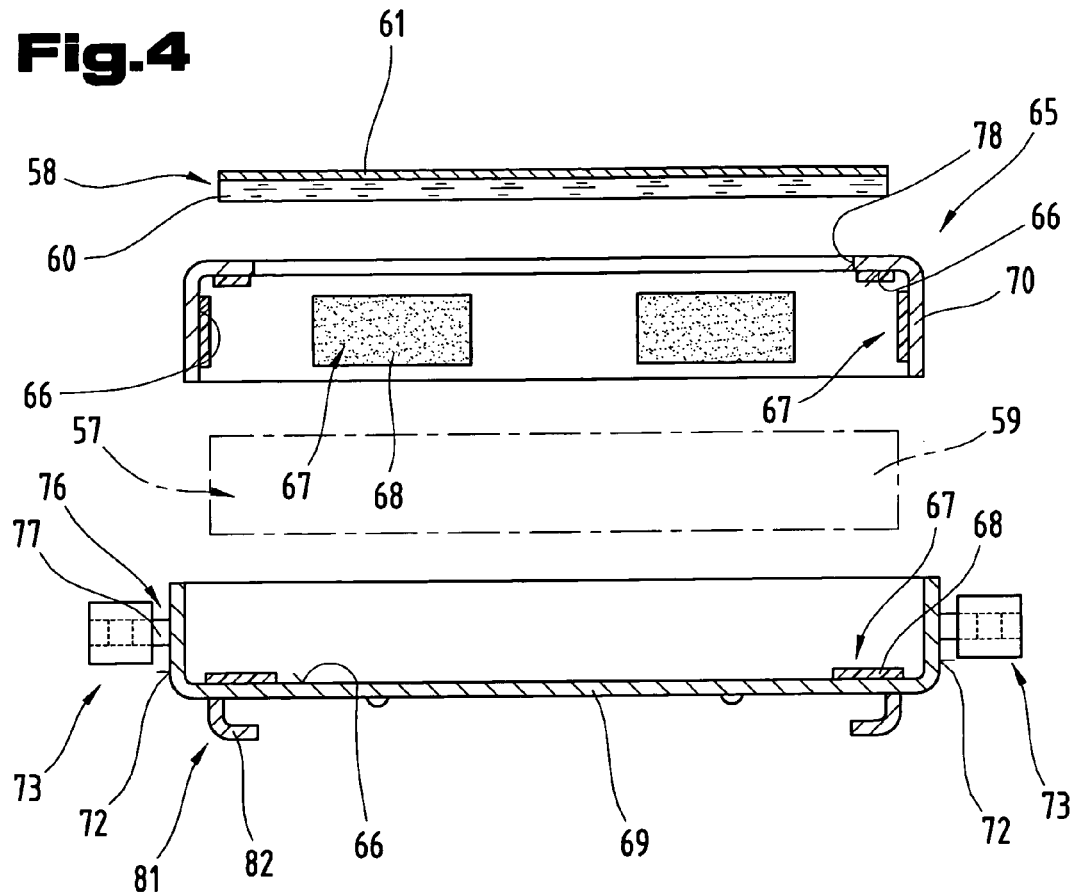
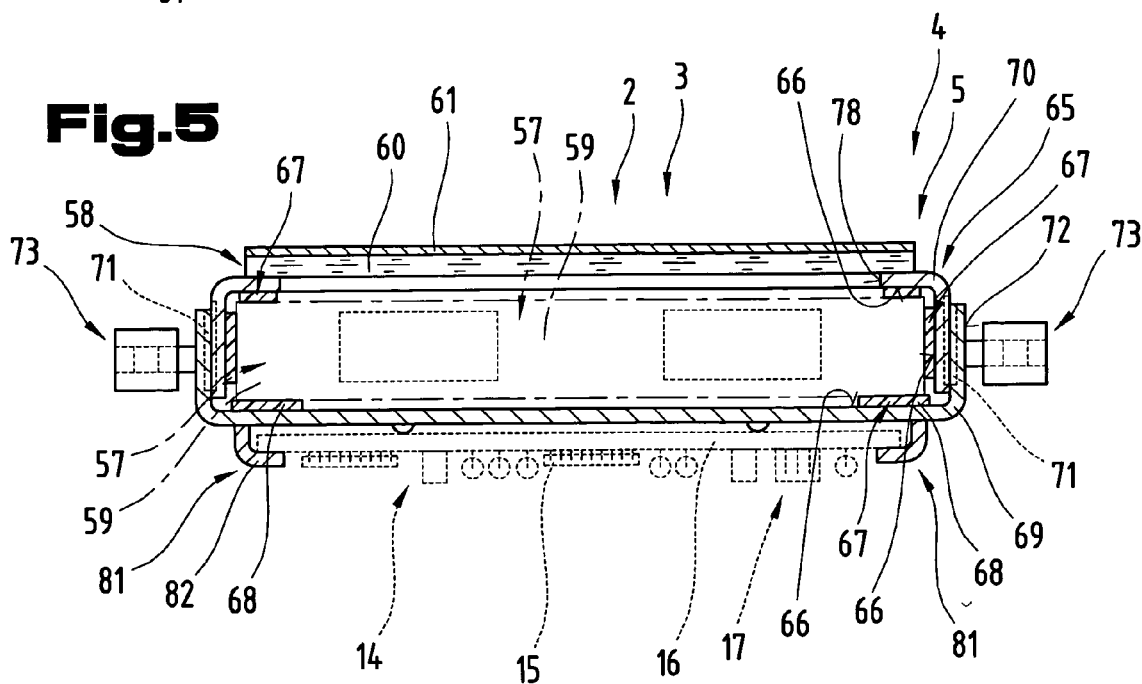

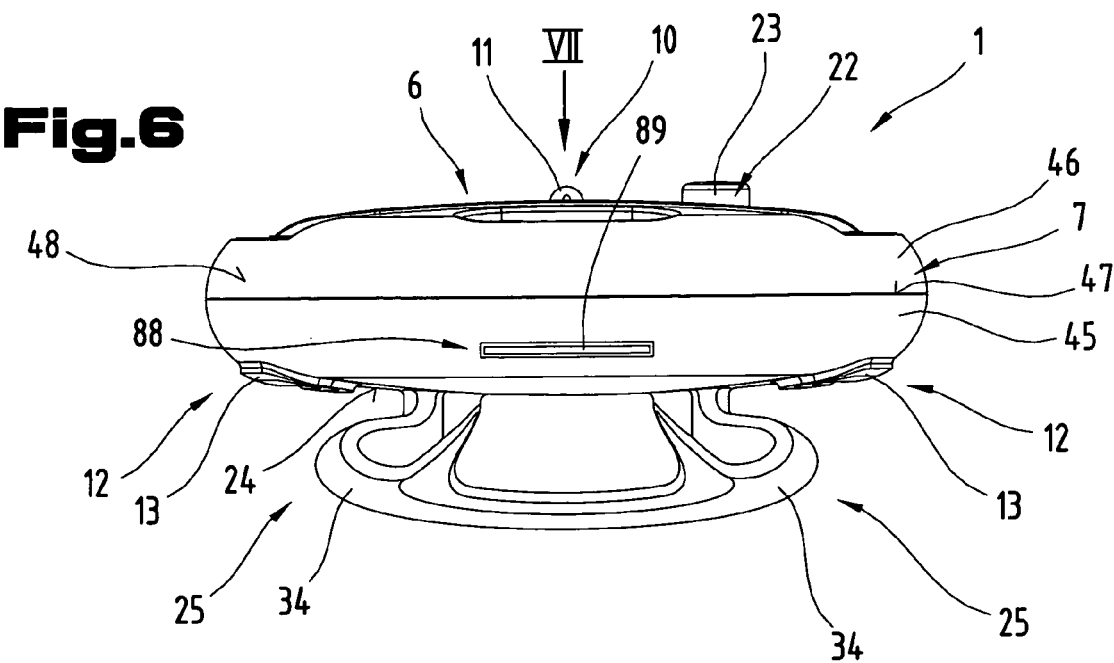
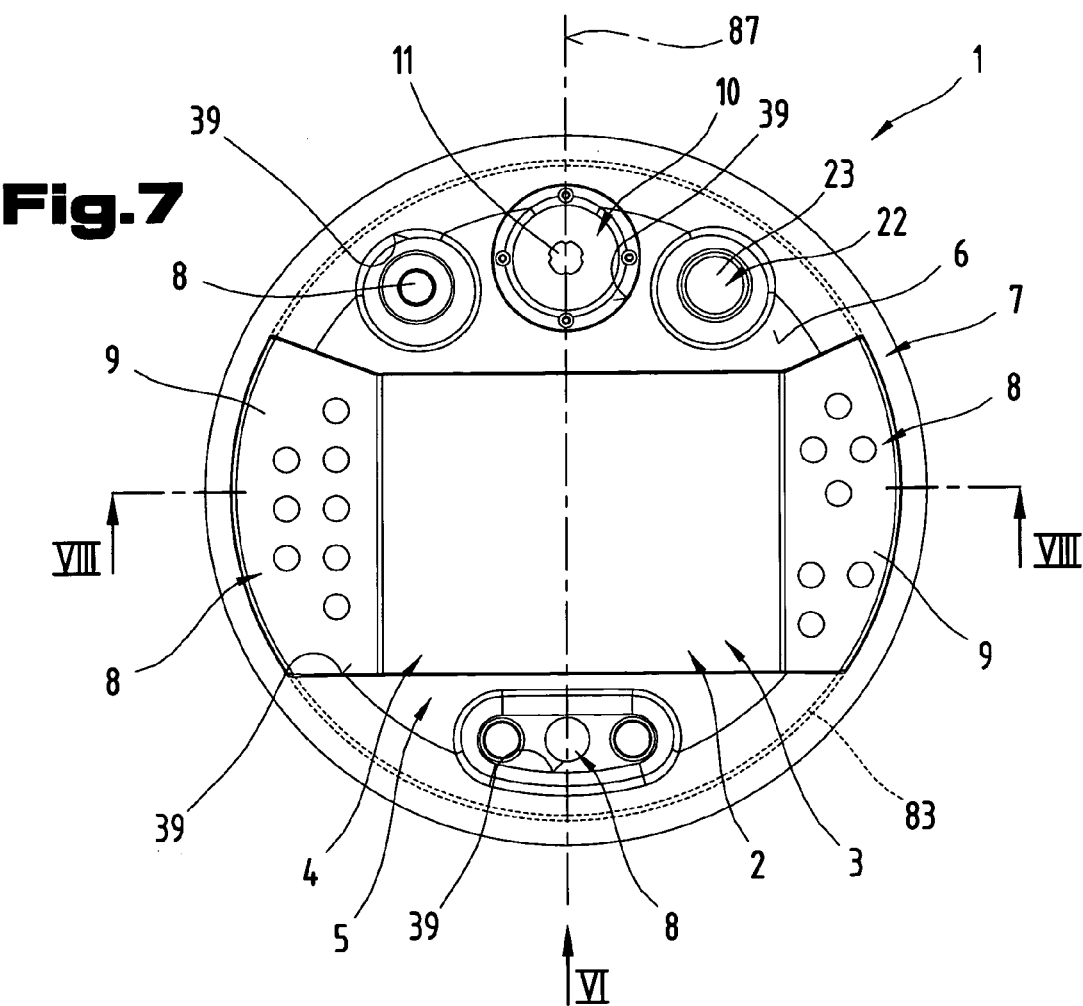

PORTABLE DEVICE USED TO AT LEAST VISUALIZE THE PROCESS DATA OF A MACHINE, A ROBOT OR A TECHNICAL PROCESS

CROSS REFERENCE TO RELATED APPLICATIONS

Applicants claim priority under 35 U.S.C. §119 of Austria Application No. A 979/2001 filed on Jun. 26, 2001. Applicants also claim priority under 35 U.S.C. §365 of PCT/AT02/00179 filed on Jun. 20, 2002. The international application under PCT article 21(2) was not published in English.

The invention relates to a portable device for at least viewing process data and/or operating a machine, a robot or technical process, of the type outlined in claim 1.

Patent specification DE 100 23 199 A1 owned by the same applicant discloses a hand-held device for robots or other electrical machines with programming and operating elements for programming and controlling motion sequences or operating states. This hand-held device incorporates a safety switch system which is used and operated in combination with the programming and operating elements of the hand-held device in order to perform safety-critical actions. The programming and operating elements of this hand-held device are pro-vided in the form of push-buttons, switches, rotating knobs or control levers. This known hand-held device also has a display, in particular a LCD display, for viewing process or input data. Individual programming and operating elements co-operate with optical signal sources, such as light-emitting diodes for example, in order to indicate their respective switch status. This hand-held device has a plurality of operating elements for managing more complex, technical processes, which makes handling more difficult for the user, as well as making it difficult to review the various functions as a whole.

The underlying objective of the present invention is to propose a device of the type outlined above, which, although incorporating numerous functions, makes it possible to oversee operation. Another objective of the invention is to propose a device of this type which is more robust.

This objective is achieved by the invention as a result of the characterising features defined in claim 1. The advantage of this approach is that the large surface touch-sensitive screen or touch screen effectively reduces the number of operating elements required in the past, such as push keys, switches, push buttons and such like. Even more complex tasks for which control consoles or control panels were needed in the past can also be handled by the mobile device proposed by the invention. The touch-sensitive screen, on which a plurality of individual graphic and menu-driven user interfaces can be displayed, permits intuitive, effortless and simple operation of the device and the technical equipment with which it is used. A major advantage resides in the fact that data can be both entered and output by means of the touch-sensitive screen, such as operating states, control commands and such like, concentrated within one cohesive region of the device. This significantly reduces the risk of incorrect operation, which could not previously be ruled out because of the necessity of looking between the display unit and input area. Another advantage of the specified design resides in the fact that the large-surface input and output area enables clearly visible display contents and information to be displayed in a large format in the form of graphics, texts and such like, enabling the display contents to be seen clearly and effortlessly at a glance or when viewed from a distance away, even by persons with poor eyesight.

Furthermore, a visually perceptible display as well as an input facility can be provided in one and the same region, which enables the surface of the top face and the size of the housing to be kept relatively compact and easy to see as a whole, even though it contains a plurality of functions. Also, a "housing in a housing" is provided so that forces acting an on the outer housing of the device are not directly transmitted to the inner housing and the frame of the display. The cage-type frame also offers high strength but is low in weight. Any bending or deformation of the frame for the display is not directly converted to a force which acts in the outer surface of the display whereby it is decoupled from forces and movements acting on the frame. The display is held in a constant position in the frame and is mounted relative to the outer frame parts so that impacts are absorbed.

The embodiment defined in claim 2 enables the output of large, rapidly perceptible display contents and input fields, providing a good overall view and minimising the risk of incorrect operation. Especially if the touch-sensitive screen occupies more than half the top face of the housing, particularly large objects can be displayed and data can be entered and options selected without difficulty, simply by pressing with the finger.

The embodiment defined in claim 3 enables the safety switching unit to be operated with the hand in which the housing of the device is also held.

The advantage of the embodiment defined in claim 4 is that the housing of the unit can be easily supported on the forearm, thereby permitting a stable holding position, even when the user is standing free, without causing fatigue, which also means that data can be entered and the screen viewed in comfort.

The embodiment defined in claim 5 enables the device to be held and gripped in several ways, so that all functions of the device are available in each of these holding positions. Since the holding or gripping positions of the device can be changed, the user is also able to counter the effects of fatigue after operation for longer periods.

The number of seams and split areas on the housing is minimized and no additional sealing elements are needed in the resilient elastic section of the housing if a soft elastic section is integral with a gripping region on the housing.

If the housing is designed to sit on a forearm of a user, the device can be held firmly and at the same time without risk of accidents in areas where there are moving machine parts.

If the housing is substantially disc- or wheel-shaped, it has no corners or sharp edges or transition regions so that the housing can be ergonomically held in the hand and, if it falls to the floor, the forces will be uniformly distributed over the entire housing because of the rounded shape, which specifically reduces any detrimental effects which would otherwise be caused by impact so that it will not be damaged even if dropped from greater heights.

An optimum ratio of the size of the top face and the size of the touch-sensitive screen is achieved if the housing is substantially rectangular. In particular, the peripheral regions around the touch-sensitive screen can be kept to a minimum in particular, which all in all makes for a compact device that is easy to handle.

If the housing is comprised of a bottom half-shell and a top half-shell, with a dividing line extending along an external surface between the top and bottom face of the housing, the inner region of the housing is readily accessible, thereby facilitating assembly and the replacement of components.

The bottom and top-half shells preferably positively engage with one another to provide a better connection between the bottom half-shell and the top half-shell, effectively preventing any relative shifting of the bottom and top half-shells in the assembled state. In addition, the bottom half-shell can be exactly positioned relative to the top half-shell, thereby facilitating assembly of the housing.

The housing may have an outer and an inner housing wall spaced at a distance apart from each other to offer a housing with a double-walled structure, thereby increasing resistance to impact and a high resistance to breakage. In particular, the outer housing wall acts as a damping element for impacts and this design provides a specific whipping or deformation path up to the point at which the outer housing wall hits the inner housing wall. An inner, harder core is therefore provided, in which the more sensitive components of the device are accommodated and at least certain regions of this inner core are surrounded by an outer deformation zone and an outer soft shell.

An internal housing wall extending between the bottom face and the top face of the housing provides a stable supporting effect between the bottom and top faces of the housing, which means that the casing surface can be provided with a pronounced curvature without detriment to the strength of the housing.

A cord-shaped sealing element accommodated between the internal housing wall and the outer housing wall enables the sealing element to be exactly positioned and reliably retained, thereby providing an efficient seal for the housing.

If the inner housing wall has overlapping top and bottom wall webs, the sealing of the inner core region of the housing can be further improved on the one hand, and, on the other, the housing is able to withstand a high degree of distortion or torsion forces without breaking open or without coming open in the seam or split region between the bottom and top half-shells.

If the touch panel comprises a transparent film adhered to a transparent or see-through plate, the display, which is particularly susceptible to stress, is effectively protected from damage without substantially impairing the display quality.

An input device which will function reliably, even under rough ambient conditions, and which is not sensitive to dirt is obtained if the touch panel works on the basis of the resistive or capacitive operating principle.

If the display is a liquid crystal display, the device has a relatively low construction height, even though it can incorporate large-surface display areas. Another major advantage is the fact that animated or motion sequences can be displayed, which are very noticeable to the user for signalling purposes or which could also be used for animated presentations of sequences.

A display permitting at least VGA resolution and a color presentation enables output of relatively high-resolution, finely contrasting graphics or symbols and text characters. The overall view of the display can be further enhanced by opting for a coloured format. In addition, intense colours can be used to highlight important information or critical states in signalling functions and less relevant data or information can be kept in less striking colours. This further enhances viewing and ensures that essential information is readily visible to the user. The risk of incorrect operation or incorrect decisions is further reduced as a result.

A display mounted in the housing in such a way that impacts are cushioned prevents the display, which is quite sensitive to impacts, from immediate damage when subjected to impact stress such as would occur if the device were dropped to the floor. The impact-damping mount of the display is designed so that the device will not be damaged, at least if dropped from a standard table height or from the position in which it is held by a user.

If the frame is comprised of a bottom shell and a top shell, which can be partially inserted one in the other and form an inner chamber for accommodating the display, the display may be effortlessly inserted in the protective cage or frame. In addition, its dimensional stability and resistance to distortion are relatively high due to the box-type nested assembly of the bottom and top shells, even though the wall thicknesses are relatively slim.

Even though the wall thicknesses of the frame are relatively slim in a frame surrounding at least the top and bottom edge regions of the display, its static capacity to withstand stress is nevertheless high. The frame is also relatively lightweight.

The soft elastic damping elements may be soft elastic foam strips disposed on the internal faces of the frame and the foam strips may be self-adhesive. Such a frame can be injection moulded from relatively dimensionally stable hard plastic and the impact-damping effect for the display to be housed can be provided in a simple manner by means of commercially available expanded foam strips.

The torsional rigidity of the frame is significantly increased if the touch panel is affixed to the external face of the frame, in particular the external face of the top shell. In particular, the interference-fit connection of the plate, which is intrinsically quite dimensionally stable, to the frame imparts particularly high dimensional stability to the frame in which the display is mounted. Consequently, the frame can be an injection moulded part made from plastic.

Distortions and deformations of the housing do not have the same effect on the touch-sensitive screen if several separate mounting tables are provided in the peripheral or external region of the frame for the touch-sensitive screen and the screen is preferably suspended in the interior of the housing at specific points by the mounting tabs.

Holding the frame in position between the bottom and top half-shell facilitates mounting of the frame in the interior of the housing and simultaneously provides an optimum mounting for the touch-sensitive screen.

If the frame is disposed between retaining pins for joining the bottom half-shell to the top half-shell, the frame and the touch-sensitive screen can be mounted in a limited floating arrangement parallel with the display and input plane thereof. Especially when the housing is subject to sudden impacts on the floor, this arrangement lengthens the time needed for the motion energy to be absorbed and reduces the peak values of the delaying forces.

If the frame is fixed in a clamped mounting by mounting tabs and screws used to loin the bottom half-shell to the top half-shell, assembly is made simpler and the number of fixing screws required is reduced.

Deformations of the housing are not transmitted to the frame of the touch-sensitive screen, or are so to a much lesser degree only, as a result of the embodiment defined in claim 54, so that there are no or very few forces acting on it.

Preferably, the individual mounting tabs are molded onto the external periphery of the frame, and the mounting tabs may project out from the external periphery and are molded onto it by means of weakened regions. Such a frame can be at least partially decoupled from any movement or deformation of the mounting tabs so that the individual points from which the frame can be suspended do not directly follow the movements of the retaining pins, thereby further enhancing the dimensional stability of the frame used for the screen.

It is more difficult for dirt to accumulate on the top face of the housing if only the bottom half-shell has orifices for inserting screws to loin the bottom to the top half-shell. The housing will therefore retain a good visual appearance overall for a long time, even if used under tough conditions. The visual appearance of the device is also improved.

Preferably, at least one supporting web is provided in the interior of the housing to support an emergency off switch, and the supporting webs(s) may support a contact block of the emergency off switch. Thus, emergency shut-down functions which are relevant to the safety of machines or personnel will continue to be available, even after the mobile or portable device has been subjected to impact-type stress. This guarantees a high level of system safety and will therefore also ensure that the device is widely accepted.

A printed circuit board of the control device may be secured to the side of the frame remote from the touch panel to be substantially decoupled from forces acting on the housing. The likelihood of any of the electronic components breaking or welds spots being damaged is therefore reduced, particularly surface-mounted components.

If the touch panel, the frame, the display and the printed circuit board of the control device are suspended inside the housing so that they float and cushion vibrations, the impact-sensitive or breakable components of the portable device are effectively protected from damage.

The control device can be rapidly assembled and mounted in the interior of the housing if the printed circuit board is secured to the frame without screws by means of a positive fixing means.

If electro-mechanical input elements and/or a control element are mounted so that they can be selectively rotated on the top face of the housing about a vertical axis by 180°, turning the holding position of the elongate housing of the device by 180° will permit intuitive operation of a control lever. In addition, the position of print indicated on keys and the directional indications of arrow keys can be adapted and corrected without difficulty.

If the central control device is connected to the display, touch panel, a displaceable control element, a safety switch device and an emergency off switch and has communication interfaces to external control devices, a central one-piece control device is provided inside the housing, thereby minimising the number of interfaces between boards of control devices which might be susceptible to errors.

If some input elements are provided in the form of a film key pad, electro-mechanical input elements with a tactile acknowledgment help to impart a positive feeling when entering data and control commands. In addition, the film key pad is advantageously particularly insensitive to moisture, dust, dirt and such like. In addition, the top face of the device is easier to clean if necessary.

The control device preferably has another interface and the housing has a slot-shaped orifice for receiving an interchangeable expansion card conforming to the PCMCIA standard, which permits a rapid change of the software modules or programmes to be run, on the one hand, and enables relatively large amounts of data to be stored on the other, and this data can be transferred without difficulty to conventional computers, for example PCs, to enable evaluations to be run or permit further data processing.

The control device may be designed for running an existing standard operating system, such as Windows CE™. Such a device can be equipped with generally known operating systems, so that very little or only brief training is needed to learn how to operate it and it will already be familiar from operating other electronic equipment.

User-defined screen masks and symbols may be presented on the display to permit graphic-assisted operation. Such a device enables a whole range of highly complex control and monitoring tasks to be individually adapted, permitting use in a very varied range of applications.

All input and control elements are preferably disposed in recesses on the top face of the housing and, when the housing is set down on any surface, none of their input and control elements can be operated. This is of advantage because the input and control elements are protected from damage, should the device fall uncontrollably to the floor. Furthermore, data and parameters can not be inadvertently altered, irrespective of how the device is put down.

The invention will be explained in more detail with reference to examples of embodiments illustrated in the appended drawings.

Of these:

FIG. 4 is an exploded diagram in section of the touch-sensitive screen illustrated in FIG. 3;

FIG. 5 shows the touch-sensitive screen illustrated in FIG. 4 in the assembled state;

FIG. 6 is a front and side view of another embodiment of the device;

FIG. 7 is a plan view of the device illustrated in FIG. 6;

Figure 1:
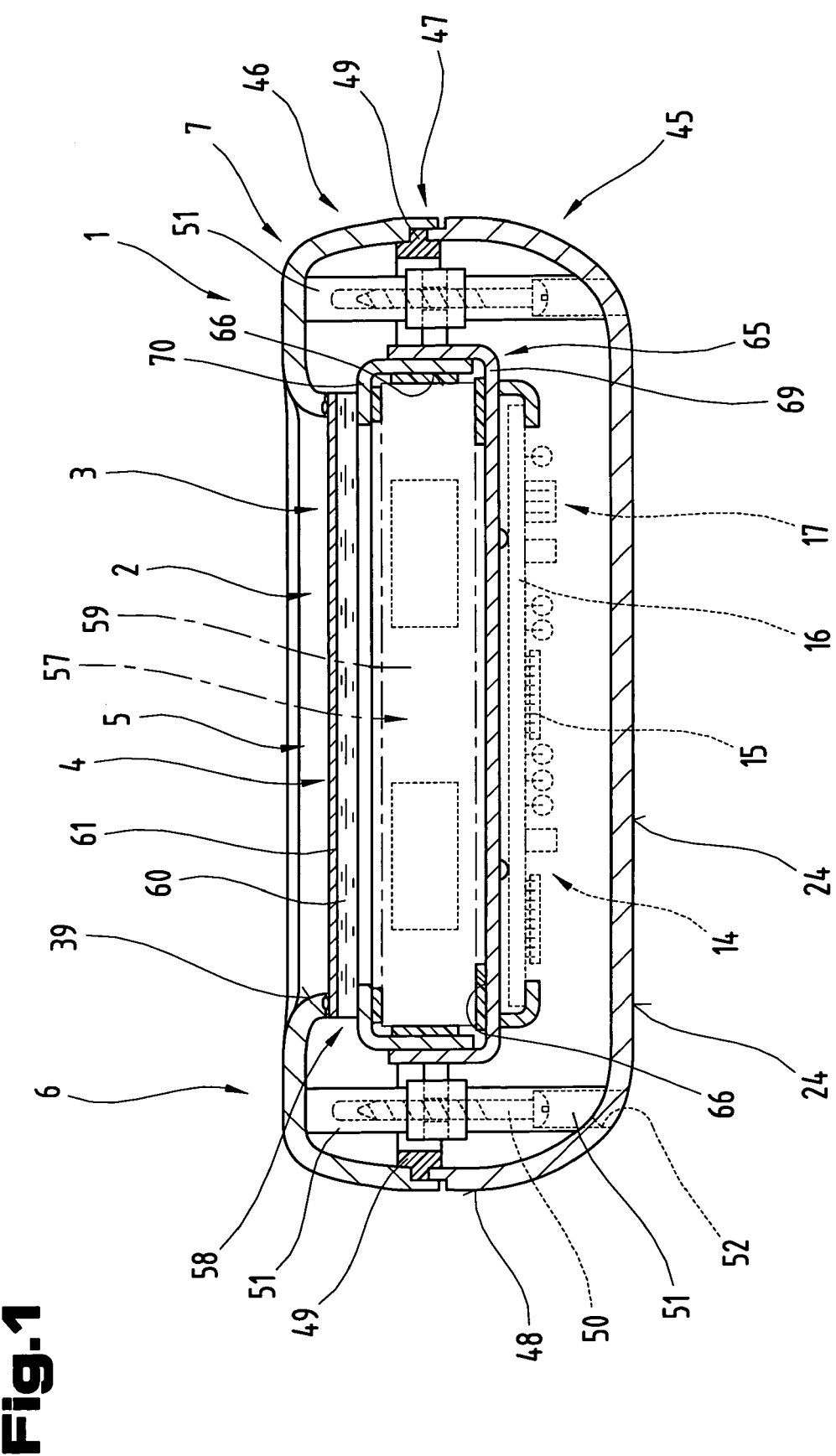
FIG. 1 is a simplified, schematic diagram of an embodiment of a portable device, in section.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

Figure 2:
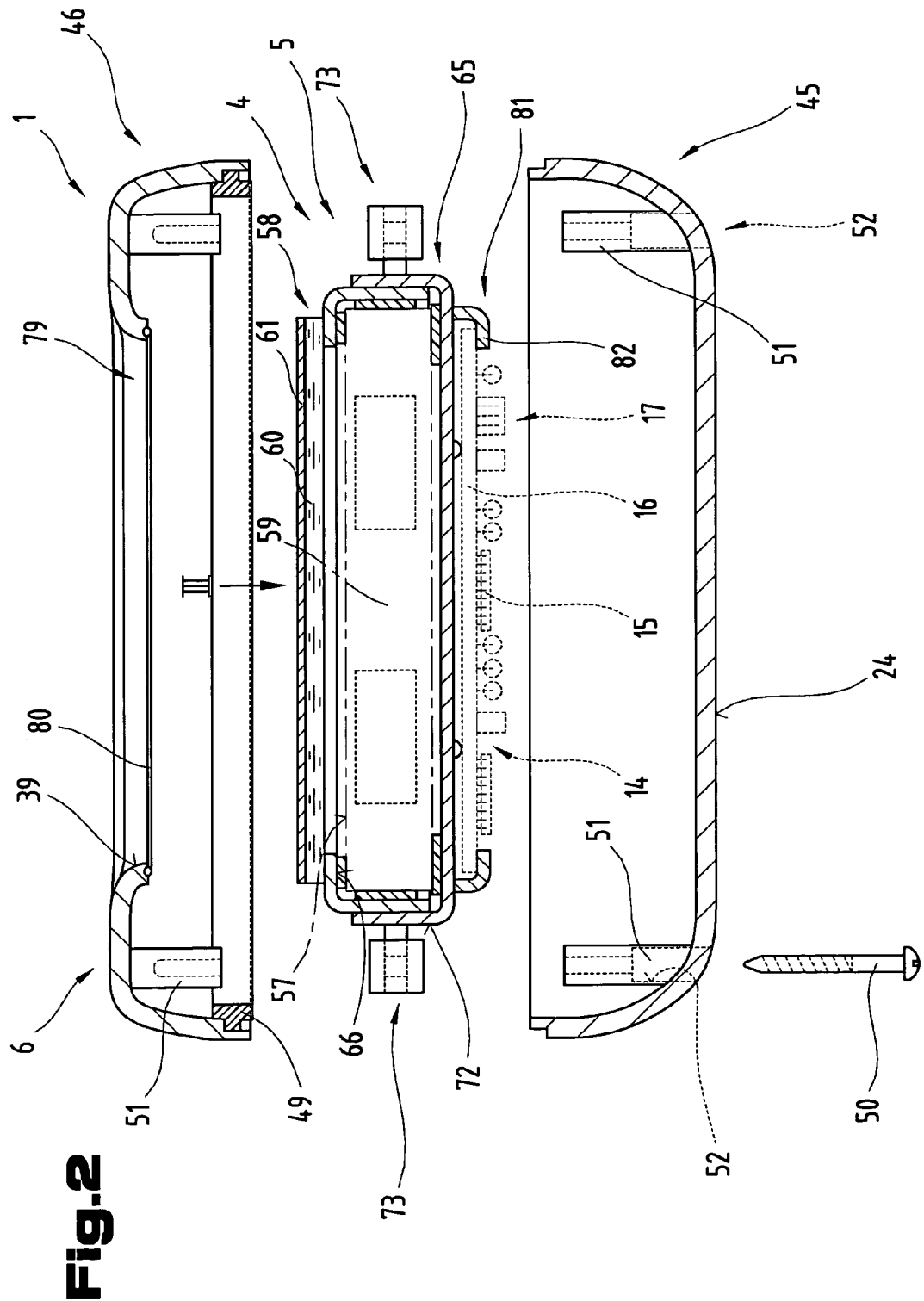
FIG. 2 is a simplified, partially exploded diagram of the section illustrated in FIG. 1.
Figure 3:
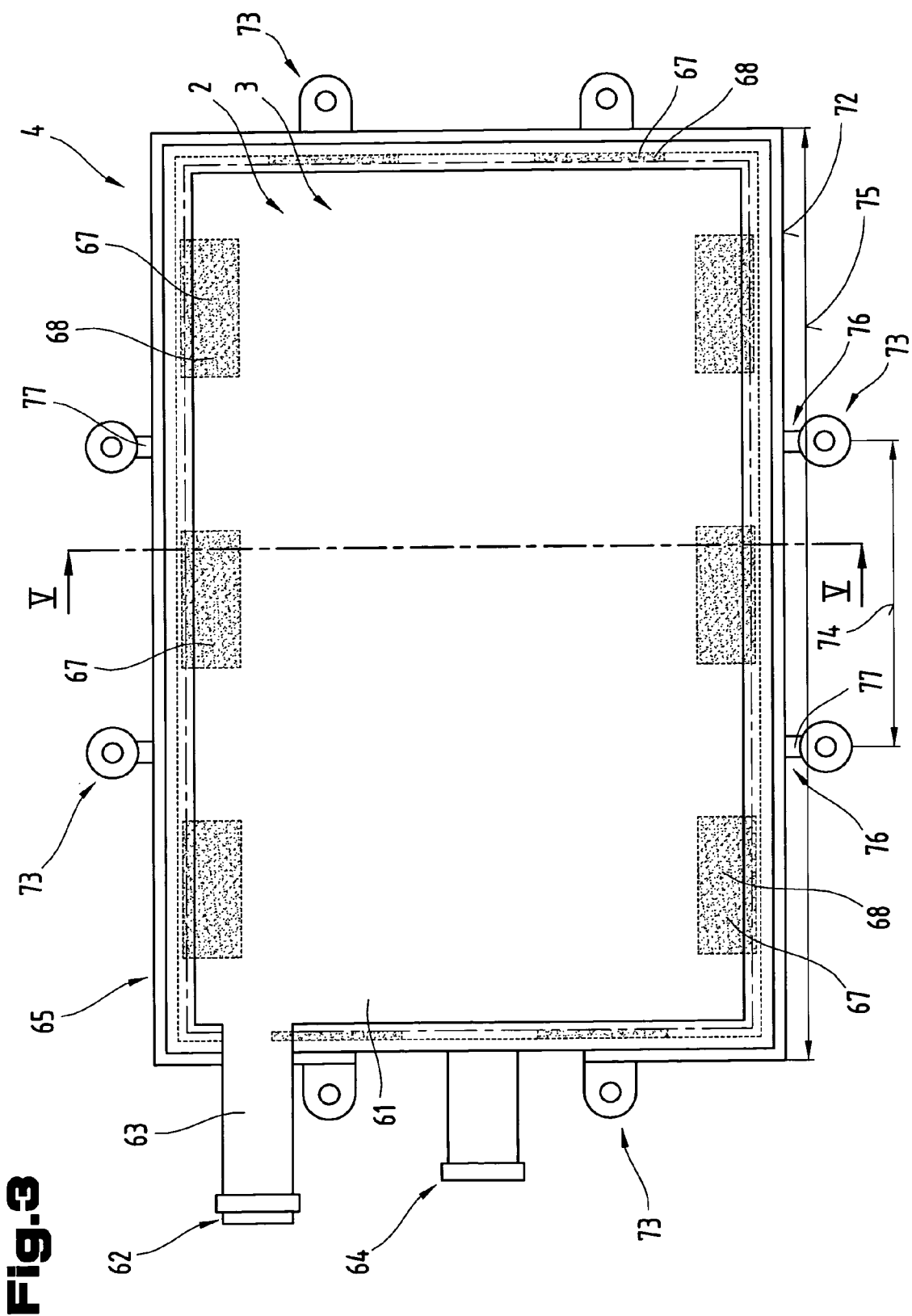
FIG. 3 illustrates a touch-sensitive screen of the type used in the device illustrated in FIGS. 1 and 2.

FIGS. 1 and 2 illustrate an embodiment of a portable or mobile device 1. This device 1 is used at least for monitoring sequences of industrial manipulators or robots, machines, etc., such as machine tools or special machines, conveyor systems, crane systems or other technical plant, by means of which technical processes can be controlled on a fully automated, semi-automated or manual basis. In addition to displaying process and system data, the device 1 is preferably also used to operate and intervene in the above-mentioned machines and process sequences. The device 1 is therefore a display and monitoring device and/or an operating device. As an alternative to or in combination with at least one of the above-mentioned applications, the device 1 may also be used for programming the sequences of machines or robots equipped with electric actuators and sensors. A programming mode of this type can also be used for what is known as "teaching" machines and robots.

The device 1 is intended to be operated by hand and its size and weight are such that it can be carried effortlessly to different locations for use. In other words, a device 1 can also be assigned to different machines or robots located at different sites from one another and the user can use the device 1 to view motion sequences and such like, for example, with a certain, albeit limited, freedom to move from one location to another.

The device 1 has at least one output device 2, at least for displaying process data of a machine, a robot or a technical process. The output device 2 has at least one visual display element and optionally also acoustic output elements, such as a buzzer, loudspeaker or such like. In addition or as an alternative to process data, input data and input menus and screen masks can also be displayed by means of the optical output device 2. Individual optical output devices 2 may also be provided in the form of optical signal sources, such as light-emitting diodes, for example.

The device 1 also has at least one input device 3, by means of which individual operating functions of at least the device 1 can be controlled and selected. However, the input device 3 is preferably also used for operating a machine or a robot and for issuing control commands to such machines. The input device 3 can therefore be used to enter, retrieve and/or edit internal sequences of the device 1 and/or a machine connected to it.

Figure 8:
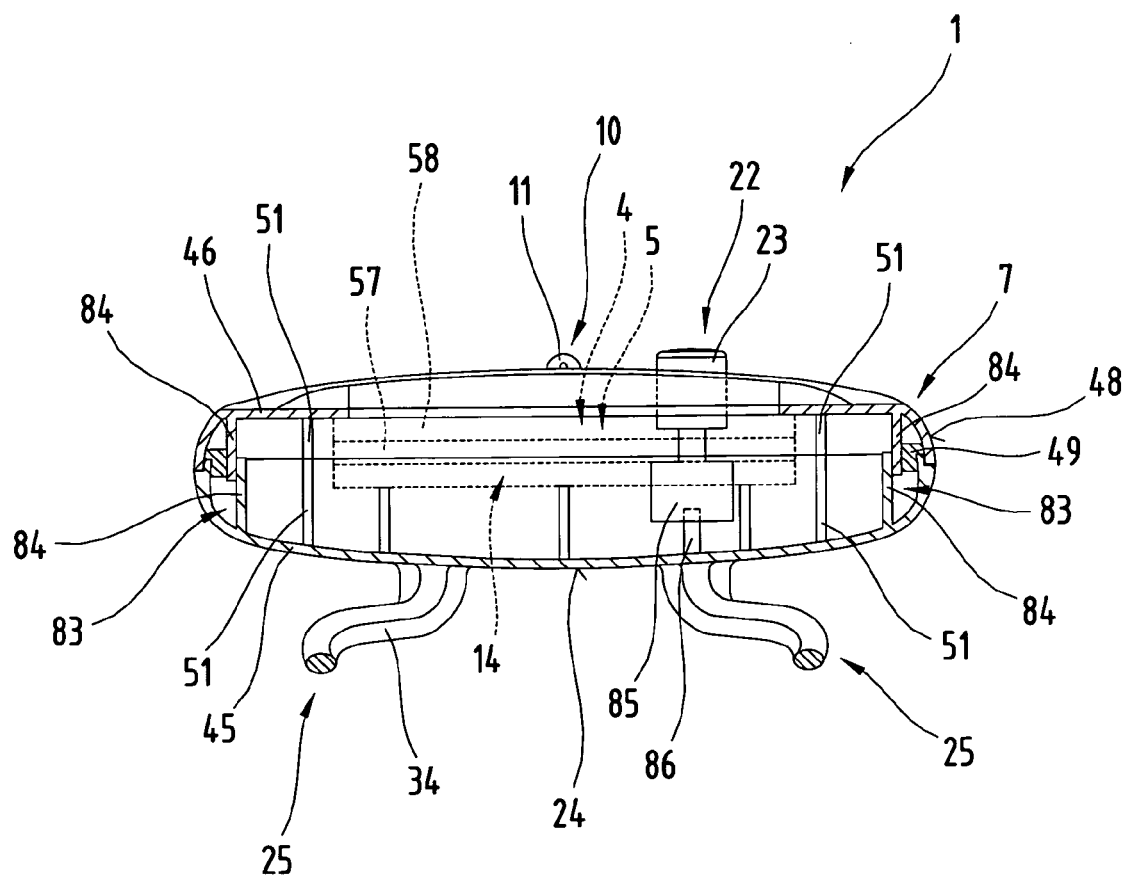
FIG. 8 is a simplified, schematic diagram of the device illustrated in FIGS. 6 and 7, viewed in section along line VIII-VIII indicated in FIG. 7.

The device 1 proposed by the invention has a combined output and input device 2, 3 in the form of a touch-sensitive screen 4. This touch-sensitive screen 4 of the device 1 constitutes what is known as a touch-screen 5, whereby the output and input device 2, 3 are functionally combined and structurally superimposed. The touch-sensitive screen 4 of the device 1 extends across substantial areas of a top surface, in particular a top face 6 of a housing 7 of the device 1. By means of this touch-screen 5, graphics, symbols, text characters and such like can be output in a known manner and entries made accordingly by operating the touch-sensitive surface with a finger or a pen-type input instrument and various actions initiated. By using a touch-screen 5 of this type, the number of control elements, such as keys, switches, levers, rotating buttons and such like, can be significantly reduced, permitting intuitive operation of the device 1. Furthermore, the large number of keys required until now can be reduced, improving the overall view and making operation more comfortable. Accordingly, the device 1 advantageously has electro-mechanical input elements 8, as shown in FIGS. 6-8, only for the most frequently used functions and functions for which a so-called tactile acknowledgement is of advantage. Such functions primarily include motion functions and switching on and off functions or functions for changing parameters up or down in increments. These input elements 8 are preferably provided by means of a film key pad 9 (FIG. 7) with tactile acknowledgement of the switching process or by input elements 8 which enable the switching point to be perceived by touch and/or acoustically.

In addition to these input elements 8 with an unambiguously perceptible switching function, the device 1 preferably also has at least one control element 10 which is moved by a user of the device 1 in the form of a control lever, joystick 11, rotatable potentiometer, a space mouse, an electronic hand wheel or similar. A control element 10 of this type is primarily used as a convenient and intuitive means of pre-setting and implementing the directions and/or speeds of movements of a machine or robot to be controlled.

The device 1 also has at least one safety switch device 12, attached to the housing 7 of the device 1, which is operated by a user primarily when running safety-critical motion sequences and changes in operating status at the same time as the actually programming or control elements 10 of the input device 3 in an appropriate manner—as will be explained in more detail below. This safety switch device 12, which might be termed a confirmation key 13, is used as a means of avoiding any unintentional, unforeseen output of control commands for a machine, a robot or a technical process. The safety switch device 12 is intended for use in combination with the actual programming or control elements 10, such as push sticks, keys or switches, for example, for activating a motion sequence or for changing an operating status of electro-mechanical machines or industrial robots. Safety switch devices 12 of this type are operated in combination with the standard operating and control elements specifically when running safety-critical motion sequences or for intentionally initiated operating modes in which there is a risk of accidents involving the machine or for persons. This being the case, the safety switch device 12 is integrated in the electric control system of the machine or robot in such a way that the programming and control elements 10 or input elements 8 to be safety-protected will not be actively initiated unless a confirm position is assumed on the safety switch device 12. The safety switch device 12 is therefore often referred to as a confirm key 13 in practice.

The safety switch device 12 or the confirm key 13 has at least one switch stage, preferably two switch stages, the respective switch positions being operated by the actual key function. In other words, a confirm position actively assumed by a user of the safety switch device 12 will only be maintained as long as the user is actively operating the corresponding switch position. Apart from the initial or non-active position, the safety switch device 12 has no other positions which can be latched or permanently assumed. In the initial or non-active position, the safety switch device 12 is switched to the first switch stage, in which the running of safety-critical control commands is not enabled. In a second switch position of the safety switch device 12, the output of safety-critical commands is enabled but is so only for as long as the user holds the safety switch device 12 in this so-called confirm state. The safety switch device 12 may and preferably does also have a third switch stage, namely a so-called panic switch mode, in which a machine to be controlled is switched to an emergency mode or in which an emergency shut-down is operated. When this third switch mode is assumed, at least all critical motion sequences and operating modes of the machine or robot are immediately halted. This third switch stage is usually assumed shortly before or during an emergency situation, e.g. in the event of impending material damage or an accident in which the hands or fingers of the operator would usually be crushed. If the user is taken by surprise due to the sudden occurrence of a risk situation, he will either take his hand off the safety switch device 12, thereby switching it to the non-active state, or the operating pressure on the safety switch device 12 is increased due to a reflex reaction, in which case it will be switched to the panic mode in which the machine or robot is also shut down or halted.

As may best be seen from FIGS. 1 and 2, the device 1 has a central electronic control device 14 in its housing 7, in which the possible operating functions of at least the device 1 are run. This control device 14 has at least one software-driven micro-computer 15, in particular a microprocessor which is of as high a rating as possible and optimised in terms of energy consumption, for running computing operations, evaluating data and controlling function sequences of the device 1 and/or a machine to be controlled. This at least one micro-computer 15 is mounted together with other electronic components, such as memory modules for temporarily storing data and/or software programmes, driver modules for interfaces, modules containing the operating system and such like, on a printed circuit board 16, all of which are accommodated in a housing 7 that is as far as possible unbreakable.

This control device 14 has at least one communication interface 17 to an external control device for a machine and/or a robot and/or to a host computer. This at least one communication interface 17 is preferably provided in the form of a standardised interface, which is suitable for connecting to generally standard data bus systems and which may be an Ethernet, CAN, serial or internet communication interface, for example, or another hard-wired interface. Alternatively or in combination with a hard-wired communication interface 17, it would naturally also be possible to use wireless communication interfaces 17, in particular in the form of radio interfaces and/or infrared interfaces on the device 1. A Bluetooth interface may advantageously also be used for the communication interface 17, by means of which a data connection can be established across an unlimited range to peripheral electronic components, such as a key pad, a mouse, a printer or another computer unit.

The electrically activated output device 2 and input devices 3 and in particular the touch-sensitive screen 4 or touch-screen 5, safety switch device 12 and the control element 10, which is displaced in translation or rotation, are wired to the control device 14 in the housing 7 via individual plug and socket connections.

The device 1 also as an emergency-off switch 22 (FIG. 6), the operating element 23 of which stands proud of the housing 7 and projects above the housing top face. When this emergency-off switch 22 is operated, a machine to be controlled is placed in the emergency-off mode, in which at least some motion sequences are halted or the power to at least some regions of the machine to be controlled is switched off. The emergency-off switch 22 is of a locking design and preferably incorporates two circuits, thereby ensuring a high degree of switching reliability so that the plant or machine parts can be safely switched off. This emergency-off switch 22 is in a readily accessible region, for example in the casing region or a corner region of the housing 7, which may be substantially rectangular seen in plan view. Naturally, it would also be possible for the operating element 23 of the emergency-off switch 22 to be disposed so that it projects out from the top face 6 of the housing 7 which is directed towards the user during operation.

The touch-sensitive screen 4 of the device 1 occupies more than about ⅓ of the top face 6 of the housing 7 directed towards the user in the usage position. The touch-sensitive screen 4 or touch-screen 5 has an effective screen diagonal of at least 7.7" or approximately 20 cm. A plurality of different graphical objects can be displayed and selected using this relatively large touch-screen 5, preferably in colour. In particular, a symbol-driven operating sequence can be run using the touch-screen 5, thereby dispensing with a number of electro-mechanical keys and switches used until now. Furthermore, a very good overall view is obtained in a simple manner, due to the software-driven elements which can be displayed simultaneously on the touch-screen 5, since only the relevant objects, data or options are highlighted.

The bottom face 24 of the housing 7 of the device 1 remote from the view of a user when the operating position is assumed has at least one gripping region 25, by means of which the device 1 can be safely and most comfortably held as it is being used for its intended purpose (FIG. 6). The safety switch device 12 is disposed in this gripping region 25 of the housing 7, which can be safely and firmly gripped by one hand by which the housing 7 is held, when the device 1 assumes the intended usage and operating positions. As a result of the features described above, only one hand of the user is needed to hold the housing 7 and operate the safety switch device 12, as may be seen more particularly from FIG. 6.

In other words, the safety switch device 12 can be switched into the switch state, in particular for confirm or emergency mode, by applying an operating force with at least one finger. Since an operating region of the safety switch device 12 is of such large dimensions, all four fingers of the corresponding hand of the user can advantageously be used to operate the safety switch device 12 accordingly.

This means that a user of the device 1 is able to operate the safety switch device 12 effortlessly and without becoming tired, even when running control and programming sequences which take longer.

Instead of providing a separate cover element for the safety switch device 12 for the orifice in the housing 7, it is possible to provide a soft elastic section 30 in a gripping region 25 of the housing 7 (FIG. 6) intended for the fingers, using a multi-component injection moulding process or an injection moulding process in which different types of plastics are injected into a mould cavity, in particular a hard plastic and a soft plastic. Using the injection moulding process known from the prior art, the soft elastic section in the gripping region 25 can be made integrally with the other regions of the housing 7 made from hard plastic. Providing an integral gripping region 26 will ensure that the housing 7 is particularly well sealed and reduces the work involved in assembly. Using a two- or multi-component injection moulding process will also enable different regions of the housing 7 to be made in different colours.

As may be seem more clearly from FIGS. 1 and 2, the housing 7 is preferably made from a bottom half-shell 45 and a top half-shell 46, which can be assembled to form a housing 7 which is substantially closed from the outside. A seam line between the half-shells 45, 46 or a separating line 47 for the two housing halves then extends along an external surface 48 of the housing 7. In particular, this separating line 47 extends around the housing 47 on its side faces. A cord-type sealing element 49 is provided in the seam region or in the region of the separating line 47, enabling the interior of the housing 7 to be sealed, preventing liquids from getting in.

In order to improve the sealing properties and increase the strength of the housing 7, the bottom and top half-shells 45, 46 nest in one another at their mutually facing edge regions in a positive arrangement. The positive fitting can be of an overhanging design so as to form additional sealing lips. This positive connection may also be designed so that it enables a mechanical snap-fitting enabling the bottom half-shell 45 to be connected to the top half-shell 46.

The bottom half-shell 45 and the top half-shell 46 are preferably connected by means of several screws 50 disposed around the periphery of the housing 7. The bottom half-shell 45 and the top half-shell 46 can be clamped to one another and the sealing element 49 pressed against the sealing surfaces of the housing parts without any gaps. Retaining pins 51 are preferably moulded onto the internal faces of the half-shells 45 and 46, in which the screws 50 are inserted and can be screwed, in order to connect the top housing part to the bottom housing part. The retaining pins 51 of the bottom half-shell 45 are dimensioned so that an appropriate screw 50 can be inserted through the retaining pins 51 from the bottom face 24. The retaining pins 51 congruently disposed in the top half-shell 46 are provided as a means of anchoring the threaded section of a screw 50. The essential factor is that orifices 52 for inserting screws 50 are provided in the bottom half-shell 45 only, in the region of the bottom face 24. The bottom half-shell 45 is therefore preferably screwed to the top half-shell 46 from the bottom face of the housing 7. Consequently, there are no screw holes in the top face 6 of the housing 7 in which dirt and such like can accumulate.

As may best be seen from FIGS. 1 to 5, the touch-sensitive screen 4 or touch-screen 5 of a display 57 is indicated by dotted-dashed lines for displaying graphic or text presentations and a touch panel 58 mounted above this display 57, which is illustrated most clearly in FIGS. 4 and 5. This touch panel 58 constitutes an input device 3 for entering data and/or selecting options and menu items shown on the display 57. The substantially square-shaped and plate-shaped display 57 and the touch panel 58, which is relatively thin compared with it, are placed in layers on top of the other, the display 57 being disposed underneath the touch panel 58 as seen when looking towards the housing 7. The display 57 is preferably a liquid crystal display 59 or so-called LCD display, enabling graphics and texts to be displayed in several colours. The display 57 used also has VGA resolution or a higher resolution capacity, in order to display graphics and texts with a fine contrast.

The touch panel 58, which is a structurally separate unit, is transparent to light so that the objects, graphics and texts shown on the display 57 can shine through the touch panel 58 and can be visually seen by a user on the top face 6 of the housing 7.

The touch panel 58 used preferably operates on the resistive or capacitive operating principle. Accordingly, changes in resistance or changes in capacitance of the touch panel 58 are detected and their position determined or the nature of the input determined within the surface of the touch panel 58. The touch panel 58 is preferably designed for inputting by finger pressure or when touched by a finger. Naturally, it would also be possible to use a touch panel 58 for which a stick and/or the finger are used for inputting.

It would also be possible to use a touch panel 58 whereby a conclusion can be drawn about the location and/or nature of a user input on the basis of the reflection behaviour of acoustic waves and/or shadowing of optical signals.

In a preferred embodiment, the touch panel 58 has at least one transparent film 61 affixed, preferably glued, onto a transparent or see-through plate 60, through which the user entries can be seen. A thickness of the film 61 is a few tenths of a mm, whereas the thickness of the plate 60 receiving this film 61, which may be a glass plate or a plate of transparent plastic, is at least 0.5 to 3 mm, preferably 1.5 mm.

This transparent plate 60 is a virtually dimensionally stable base element for the intrinsically flexible film 61, by means of which stick or finger entries of a user can be detected. As a result of the material chosen, namely, glass or transparent hard plastic, the plate 60 has a relatively high dimensional stability and resistance to distortion due to its thickness. The sensitive film 61, of which the full surface is preferably glued to the plate 60 with a transparent adhesive, has an electrical interface 62, in particular several plug contacts, by means of which the film 61, which has conductor tracks running at least along its periphery, can be connected to the control device 14—FIG. 1. The connecting line between the interface 62 and the film 61 is preferably flexible, in particular provided in the form of a film conductor 63. Being a combination of the film 61 with this supporting plate 60, the touch panel 58 is relatively insensitive or unbreakable and is able to withstand high stress. The display 57, on the other hand, in particular the liquid crystal display 59, is relatively sensitive to deformations and impact stress due to its structure. Above all, deformations and/or pulse-type forces or impacts can lead to damage or even cause the display 57 to break. Functional impairment or damage to the display 57 may primarily be caused by too high an impact stress or deformation and or compression stress on its display surface. In order to prevent damage to the most sensitive components of the device 1, the display 57 is mounted in such a way that impacts are absorbed as far as possible but its position inside the housing 7 is nevertheless stable. Preferably, the display 57 is also decoupled as far as possible from deformations and distortion affecting the housing 7.

To this end, the display 57, indicated in dotted-dashed lines, which also has at least one electrical interface 64 for transmitting and/or receiving data and/or power, is surrounded by a frame 65 which encloses the display 57 in a protective cage, at least in certain regions. As a result of this cage-type frame 65 around part regions of the external boundaries of the display 57, indicated by broken lines, the display 57 is retained and fixed in position inside the housing 7. In particular, the substantially square-shaped or plate-shaped display 57 is mounted in a suspended arrangement in the interior of the housing 7 by means of this frame 65. In other words, the bottom face of the display 57 remote from a display surface does not sit against any of the internal walls of the housing 7 as far as possible, as may be seen from FIG. 1. The frame 65 and in particular the display 57 are in fact mounted and secured so as to be suspended from retaining pins 51 at several points inside the housing 7.

The internal dimensions or the clearance widths of the frame 65 around the edges or peripheral regions of the display 57 are therefore slightly bigger than the external dimensions of the display 57 indicated by dotted-dashed lines. Provided between internal faces 66 of the frame 65 and external or side faces of the substantially square-shaped display 57 are soft elastic damping elements 67. This being the case, a thickness of these soft elastic damping elements 67 is selected so that they mount the display 57 clearance-free but in an absorbing arrangement inside the frame 65, i.e. the display 57 is prevented from slipping relative to the frame 65 of slightly larger dimensions but enables impact stress to be cushioned relative to the internal faces 66 of the frame 65 to a certain extent. The damping elements 67 are resiliently elastic and rebound so that after cushioning or a displacement of the display 57 relative to the frame 65 due to impact stress and/or distortion, the display 57 is guaranteed to return exactly to its initial or non-active position. The resiliently elastic damping elements 67 are preferably positioned against the internal faces of the frame 65 at least in certain regions, and are provided in the form of soft elastic foam strips 68, which preferably provide an impact-damping action for the display 57 in all three spatial directions. In a preferred embodiment, these foam strips 68 are self-adhesive and are adhered to some internal faces 66 of the frame 65, as may be seem more particularly from FIG. 4. Consequently, the display 57 can be effortlessly inserted in and removed from the frame 65 with the damping elements 67 which damp the display 57.

The frame 65, which runs at least round the top and bottom edge regions of the square-shaped display 57, may be made in a single piece or preferably several pieces. The frame 65 for holding the display 57 is preferably made in two pieces. In particular, the frame 65 is made from a bottom shell 69 and a top shell 70 or a corresponding cover element. The top shell 69 and the bottom shell 70 are such that they can be at least partially inserted in one another and in the assembled state—illustrated in FIG. 5—form an interior bounded in at least certain regions from the outside for receiving the display 57. The top part of the frame 65 or top shell 70 has an orifice, which more or less corresponds to the size of the display field of the display 57. In other words, the top shell 70 surrounds only the top edges or peripheral regions of the display 57. The bottom shell 69 may also have one or more orifices in order to reduce the weight of the frame 65 without at the same time significantly reducing its strength.

The bottom shell 60 and the top shell 70 may be nested one in the other in a box-type arrangement. The dimensions of the bottom and top shell 69, 70 are selected so that they locate in one another, as far as possible without any clearance in all directions, parallel with the display surface of the display 57.

At the touching or contact points between the bottom shell 69 and the shell 70 inserted in it, positive connections 71 may be provided, for example in the form of groove and tongue connections, thereby enabling the resistance to distortion and dimensional stability of the assembled frame 65 to be further enhanced. In the direction perpendicular to the display 57, the two frame parts are displaceable relative to one another so that the two frame parts can be assembled with one another and then dismantled again. The connections 71 may also be provided in the form of snap-fit or catch connections, thereby enabling the bottom shell 69 to be connected to the top shell 67 in a snap-fit connection which is preferably releasable.

A somewhat more stable frame 65 which is more resistant to distortion and forms a protective cage around the sensitive display 57 is obtained as a result of the at least partially nested arrangement of the bottom shell 69 and the top shell 70. The features described above therefore provide a frame 65, preferably made from hard plastic, which is very strong but nevertheless relatively lightweight. The soft elastic damping elements 67 also ensure that the display 57 and the liquid crystal display 59 are protected from distortion as far as possible. Any distortion to the frame 65 which does occur in the event of a heavy impact of the housing 7 on the floor can be absorbed and compensated to a certain extent by the damping elements 67 and the foam strips 68.

To protect the display 57 housed in the frame 65 even more effectively, the frame 65 is virtually suspended in the interior of the housing 7 at certain points only. To this end, mounting tabs 73 are disposed separately in the external region 72 and on at least two narrow sides of the frame 65. The touch-sensitive screen 4, in particular its display 57 and touch panel 58, is suspended or mounted at individual points in the interior of the housing 7 by means of these mounting tabs 73, which are separately arranged around the periphery or external region 72 of the frame 65 and preferably integral therewith. A mounting tab 73 of this type therefore extends across only a fraction of the length or width of the frame 65, as is most clearly illustrated in FIG. 3. In principle, it is necessary to provide only three mounting tabs 73 around the periphery of the frame 65 to render the mounting of the touch-sensitive screen 4 inside the housing 7 sufficiently strong. In the embodiment illustrated as an example here, two respective mounting tabs 73 are provided in each of the widthways and lengthways faces of the frame 65, as may best be seen from FIG. 3. This being the case, a distance 74 between two mounting tabs 73 on one side of the frame 65 corresponds to approximately half a length 75 of the frame 65 on the respective side. This provides a mounting for the frame 65 or touch-sensitive screen 4 in the housing 7 which prevents tilting on the one hand and, on the other hand, provides efficient decoupling with respect to distortions of the housing 7. In other words, the relatively narrow spacing of the mounting tabs 73 from one another means that any deformation or distortions to which the housing 7 is subjected, such as might result if it were dropped to the floor for example, have a much less detrimental effect on the frame 65. In particular, the mounting tabs 73 are spaced at a relatively large distance from the corner regions of the frame 65, so that any deformation forces transmitted via the mounting tabs 73 to the frame 65 which might cause the frame 65 to become distorted are kept to a minimum. In the ideal situation, only one respective mounting tab 73 is provided at the centre of each of each of the longitudinal and widthways sides of the frame 65.

In order to reduce deformation or distortions to the frame 65 even further, the mounting tabs 73 projecting out form the external contour of the frame 65 are preferably moulded onto the frame 65 by means of weakened regions 76. These weakened regions 76 between the frame 65 and the actual mounting tabs 73 may be provided in the form of very slim connecting webs or even as connecting elements of the film-hinge type. The size or diameter of the actual mounting tabs 73 as such is slightly bigger than a head of the screw 50 used for fixing purposes, as may be seen more clearly from FIG. 1. These weakened regions 76 or narrow connecting webs 77 between the mounting tabs 73 and the frame 65 permit compensating movements between these weakened regions 76 or connecting webs 77 or at least result in a certain degree of uncoupling if deformation movements are transmitted from the housing 7 via the retaining pins 51 to the mounting tabs 73. The connecting webs 77, which may be provided as an option, therefore improve or permit a decoupling of movements of the mounting tabs 73 relative to the frame 65 with the display 57 to a certain degree.

As may be seen most clearly from FIGS. 1 or 4 and 5, the touch panel 58 is affixed to an external face of the frame 65 directed towards the top face 6 of the housing 7. In particular, the touch panel 58 is affixed to the external face of the top shell 70 and is preferably adhered thereto. The transparent plate 60 of the touch panel 58 specifically spans an aperture 68 in the top shell 70, by means of which the display region of the display 57 is left free. The peripheral regions of this aperture 68 in the top shell 70 or in the frame 65 are then joined to the bottom face of the relatively rigid plate 60 in a positive fit and are so as far as possible across their entire surface, in particular glued, as may be seen from FIG. 5. The positive connection between the touch panel 58 and its transparent plastic or glass plate and the frame 65 imparts particularly high dimensional stability to the frame 65. The adhesive between the touch panel 58 and the frame 65 for the display 57 is therefore as inflexible as possible and has a permanently high adhesive strength.

The box-type design of the frame 65 and/or the positive connection of the frame 65 to the touch panel 58 significantly increases resistance to distortion and the dimensional stability of the frame 65, all in all affording good protection for the sensitive and less robust display 57. The damping elements 67 and/or the mounting tabs 73 disposed and/or moulded onto the frame 65 may further improve the mounting of the display 57 in the housing 7 of the device 1, providing a perfectly robust and secure mounting for the touch-sensitive screen 4 of the device 1.

As may be seen most clearly from FIGS. 1 and 2, the frame 65 is held in position between the bottom and top half-shells 45, 46. In particular, the frame 65 is fixed between the bottom and top half shells 45, 46 by means of the mounting tabs 73. The frame 65 is preferably fixed in a clamping arrangement via the mounting tabs 73 and the screws 50 for connecting the bottom housing part or bottom half-shell 45 to the top housing part or top half-shell 46. The mounting tabs 73 of the frame 65 are clamped between the mutually facing terminal ends of the respective retaining pins 51 in particular, once the housing parts are connected or screwed to one another by means of the screws 50. Individual retaining screws may also be provided as a means of holding the frame 65 incorporating the touch panel 58 and the display 57 in position in one of the half-shells 45, 46, thereby facilitating assembly of the housing 7 and device 1.

A length of the retaining pin 51 and/or a spacing of the mounting tabs 73 relative to the frame 65 is therefore selected so that the frame 65 is retained in the interior of the housing 7 without any clearance. Furthermore, a length of the retaining pin 51 of the top half-shell 46 and/or a spacing of the mounting tabs 73 on the frame 65 is selected so that the touch panel 58 is pushed against the edge or peripheral regions of an aperture 79 in the top half-shell 46 of the housing 7 with a certain amount of clamping force. The dimensions of the aperture 79 in the top half-shell 46 of the housing 7 are selected so that the display area of the display 57 is visible and the surrounding frame parts or peripheral regions of the touch panel 58 are covered. A peripheral seal 80 is preferably provided in the peripheral or edge regions of the aperture 79, which is preferably at least partially inserted in a groove or recess in the top half-shell. When the device 1 or housing 7 is in the assembled state, this seal 80 prevents dirt and moisture from getting into the interior of the housing 7 via the display area and via the aperture 79 in the top half-shell 46. In the assembled state illustrated in FIG. 3, this seal 80 is pressed against the top face of the touch panel 58 or sensitive film 61 in order to seal the interior of the housing 7 from the environment around it without any gaps.

In addition to the touch panel 58 and display 57 being affixed to the frame 65, the printed circuit board 16 of the control device 14 is also preferably affixed to the frame 65. In particular, this printed circuit board 16 incorporating the control electronics is disposed on the flat face of the frame 65 remote from the touch panel 58. The printed circuit board 16 is preferably mounted on the frame 65 by means of positive fixing means 81 in the form of angled webs 82 disposed in the edge regions of the printed circuit board 16 and hence without screws. Latch means prevent the printed circuit board 16 from inadvertently shifting relative to the angled webs 82.

The layered structure comprising the relatively dimensionally stable touch panel 58, the frame 65 comprising two parts nested one inside the other and the printed circuit board 16 and/or the described arrangement and/or layout and design of the mounting tabs 73 of the frame 65 and/or the damping elements 67 together constitute a perfectly effective protective cage for the large surface display 57, which is sensitive to shocks and usually susceptible to breakage. It is only as a result of the features described above that sensitive components of this type can now be used for portable or mobile devices 1 in industrial environments. In particular, if the device 1 is dropped to the floor from a height of up to 1.5 m, the device 1 and the electronic components or the display 57 will not suffer any direct damage.

Once the touch panel 58, frame 65, display 57 and printed circuit board 16 of the control device 14 are suspended on the pin-type retaining pins 51 projecting out from the half-shells 45, 46, these components sit in a floating or damping mounting inside the housing 7, as a result of which relatively high, pulse-type delay forces, such as would occur due to the housing 7 of the device 1 crashing to the floor, do not directly damage or break the components. This results in an extremely robust, accident-proof device 1 overall, which is well suited for use in industrial environments.

FIGS. 6 to 8 illustrate a different embodiment of the device 1 or a so-called handheld terminal for mobile operation and control and/or for viewing process data of electrical machines or industrial robots. The same reference numbers are used for parts that have already been described above and the relevant sections of the description apply to parts denoted by the same reference numbers.

In this case, the housing 7 is of an essentially disc or wheel-shaped design. In other words, there are no corners at the outer peripheral faces or surfaces of the housing 7 and there are only a few edges round the top face 6 of the housing 7 and these are as blunt as possible. What edges there are predominantly extend around the recesses 39 provided as a means of mounting the input elements 8, the control element 10 and the touch-sensitive screen 4, which are at least partially recessed from the surface on the top face 6 of the housing 7.

The gripping region 25 enabling a user to hold the device 1 is again provided on the bottom face 24 of the found, in particular circular housing 7 illustrated in plan view in FIG. 7. Alternatively, the top face 6 of the device 1 could also have an elliptical shape. This being the case, the gripping region 25 of the housing 7 is provided in the form of a gripping piece 34 attached to the bottom face 24, which has several possible gripping or holding positions due to its peripheral region. In particular, the shape of the gripping piece 25 is such that it has a gripping region 25 for left-handed operation as well as a gripping region 25 for easier operation by a right-handed person. Consequently, this device 1 can be used by both right-handed persons and left-handed persons without the need for any modification and is equally comfortable and sensitive to use in either mode. Each of these at least two gripping regions 25 for left-handed and right-handed operation and for holding the device 1 has its own safety switch device 12. This safety switch device 12 may be designed and mounted on the housing 7 as illustrated in FIG. 6 or alternatively may be disposed close to or directly adjacent to the gripping piece 34. The essential point is that the gripping piece 34 is disposed and dimensioned such that the device 1 can be held by the user with only hand and the safety switch device 12 simultaneously operated with this hand.

As may be seen most clearly from FIG. 8, the housing 7 has the outer and an inner housing wall 83 at a distance apart therefrom, at least in the region of its external face 48. The housing 7 is therefore made up of two shells, at least in its external region 48. The inwardly lying housing wall 83 extends substantially between the base and cover plates of the housing 7 forming the bottom face 24 and the top face 6 of the housing 7.

The bottom half-shell 45 and the top half-shell 46 are specifically provided with wall webs 84 running in a circle and extending congruently with one another, which can overlap with one another when the half-shells 45, 46 are in the assembled state. The strip-type sealing element 49 for the split or seam region of the two half-shells 45, 46 may be accommodated in a stable position between the inwardly lying housing wall 83 and the outer housing wall. The design of the housing 7 with double walls in at least certain regions significantly increases its resistance to breaking and its resistance to distortion. In addition, the outer housing wall may be used as an absorber or damper for impact-type stress and deformation in the event of the device 1 falling to the ground due to clumsiness.

The robustness and functional reliability of the device 1 can be further enhanced if at least one supporting web 86 is provided specifically for the emergency off switch 22, in particular its electrical contact block 85 in the interior of the housing 7. The purpose of this supporting web 86 is to support the emergency off switch 22 and its contact block 85 in the interior of the housing 7 and help it to withstand stress. In particular, the at least one supporting web 86 cushions the contact block 85 and prevents it from being torn off the operating element 23 in the event of a hefty impact of the housing 7. Supporting webs 86 of this type for the emergency off switch 22 also ensure that the device 1 is always reliable and secure, even if subjected to hard knocks.

To optimise use of the device 1 for left-handed and right-handed operation without having to make any major adaptations, the top face 6 of the housing 7 and the gripping piece 43 are substantially symmetrical by reference to a bisecting line 87.

As may be seen in particular from FIG. 6, the housing 7 may also have a slot-shaped orifice 88 for receiving an interchangeable electronic expansion card 89, for example a memory card conforming to the PCMCIA standard. This orifice 88 for inserting at least one expansion card 89 is preferably disposed in the external surface 48 of the housing 7. Naturally, however, it would also be possible for the orifice 88 to be provided on the top face 6 or on the bottom face 24 of the housing 7. The expansion card 89 can be electrically connected to the control device 14 via an appropriate interface in the interior 14 of the housing 7. The interface is preferably an electrical plug contact-interface conforming to the PCMCIA standard, enabling it to be inserted, removed or exchanged for another expansion card 89 without the need for tools.

The control device 14 or its micro-computer is preferably suitable for running a standard, readily available operating system. The operating system or basis for running internal routines of the control device 14 may be the relatively common, widely used and well known Windows CE™ operating system. Through the operating system, user-defined screen masks and symbols can be presented on the display 57 to provide various designs for graphics-assisted operation. The fact of using a widely known operating system will significantly reduce the effort and/or time needed for training in how to operate the device 1. This will also improve acceptance of the device 1.

For the sake of good order, it should finally be pointed out that in order to provide a clearer understanding of the structure of the device 1, it and its constituent parts are illustrated to a certain extent out of scale and/or on an enlarged scale and/or on a reduced scale.

The invention claimed is:

1. Portable device (1) comprising at least one optical output device (2) for displaying at least process data of a machine, a robot or a technical process, at least one input device (3) for at least intervening in operating functions of the device (1) and/or for operating the machine or robot or technical process, and having a safety switch device (12) for preventing the output of undesirable, unintended control commands for the machine, robot or technical process, the at least one output device (2) and the at least one input device (3) being connected to a control device (14), the control device (14) being received in a substantially unbreakable housing (7) and having at least one communication interface (17) to an external control device disposed at a distance away, wherein several input and output devices (2, 3) are functionally combined by means of a touch-sensitive screen (4) in the form of a touch panel (58) and a display disposed underneath it, and the touch-sensitive screen (4) extends across substantial regions of a surface of the housing (7), at least some regions of the display (57) are surrounded by a cage-shaped frame (65), by means which the display (57) is held in position in an interior of the housing (7), the frame (65) has internal dimensions or clearance widths slightly bigger than external dimensions of the display, and soft-elastic damping elements (67) are disposed between internal faces (66) of the frame and external faces of the display.

2. Portable device as claimed in claim 1, wherein the touch-sensitive screen (4) occupies more than one third of a top face (6) of the housing (7) directed towards a user in an operating position.

3. Portable device as claimed in claim 1, comprising several holding or gripping regions (25) on the housing (7), and the safety switch device (12) is disposed in the immediate vicinity of every gripping region (25).

4. Portable device as claimed in claim 1, wherein the housing (7) is designed to sit on a forearm (35) of a user.

5. Portable device as claimed in claim 1, wherein the housing (7) is substantially rectangular as seen in plan view.

6. Portable device as claimed in claim 1, wherein the housing (7) is comprised of a bottom half-shell (45) and a top half-shell (46), and a dividing line (47) extends along an external surface (48) between a top face and bottom face (6, 24) of the housing (7).

7. Portable device as claimed in claim 6, wherein the bottom and top half-shell (45, 46) positively engage with one another.

8. Portable device as claimed in claim 6, wherein the frame (65) is held in position between the bottom and top half-shell (45, 46).

9. Portable device as claimed in claim 6, wherein the frame (65) is disposed between retaining pins (51) for joining the bottom half-shell (45) to the top half-shell (46).

10. Portable device as claimed in claim 6, wherein the frame (65) is fixed in a clamped mounting by means of the mounting tabs (73) and screws (50) used to join the bottom half-shell (45) to the top half-shell (46).

11. Portable device as claimed in claim 6, wherein only the bottom half-shell (45) has orifices (52) for inserting screws (50) to join the bottom to the top half-shell (45, 46).

12. Portable device as claimed in claim 1, wherein the housing (7) has an outer and an inner housing wall (83) spaced at a distance apart from each other.

13. Portable device as claimed in claim 12, wherein the inner housing wall (83) essentially extends between a bottom face (24) and a top face (6) of the housing (7).

14. Portable device as claimed in claim 12, comprising a cord-shaped sealing element (49) arranged between the inner housing wall (83) and the outer housing wall.

15. Portable device as claimed in claim 12, wherein the inner housing wall (83) has overlapping top and bottom wall webs (84).

16. Portable device as claimed in claim 1, wherein the touch panel (58) comprises a transparent film (61) adhered to a transparent or see-through plate (60).

17. Portable device as claimed in claim 1, wherein the touch panel (58) works on the basis of the resistive or capacitive operating principle.

18. Portable device as claimed in claim 1, wherein the display (57) is a liquid crystal display (59).

19. Portable device as claimed in claim 1, wherein the display (57) permits at least VGA resolution and a colour presentation.

20. Portable device as claimed in claim 1, wherein the display (57) is mounted in the housing (7) in such a way that impacts are cushioned.

21. Portable device as claimed in claim 1, wherein the frame (65) is comprised of a bottom shell (69) and a top shell (70), which can be partially inserted one in the other and form an inner chamber for accommodating the display (57).

22. Portable device as claimed in claim 1, wherein the frame (65) surrounds at least the top and bottom edge regions of the display (57).

23. Portable device as claimed in claim 1, wherein the soft elastic damping elements (67) are soft elastic foam strips (68) disposed on the internal faces (66) of the frame (65).

24. Portable device as claimed in claim 23, wherein the foam strips (68) are self-adhesive.

25. Portable device as claimed in claim 1, wherein the touch panel (58) is affixed to an external face of the frame (65).

26. Portable device as claimed in claim 1, comprising several separate mounting tabs (73) in a peripheral or external region (72) of the frame (65) for the touch-sensitive screen (4).

27. Portable device as claimed in claim 26, wherein the touch-sensitive screen (4) is suspended in the interior of the housing (7) at specific points via the mounting tabs (73) of the frame (65).

28. Portable device as claimed in claim 26, wherein a distance (74) between two mounting tabs (73) on one side of the frame (65) substantially corresponds to half of a length (75) of the frame (65) on this side.

29. Portable device as claimed in claim 26, wherein the individual mounting tabs (73) are moulded onto the external periphery of the frame (65).

30. Portable device as claimed in claim 26 wherein the mounting tabs (73) project out from the external periphery of the frame (65) and are moulded onto to it by means of weakened regions (76).

31. Portable device as claimed in claim 1, comprising at least one supporting web (86) in the interior of the housing (7) to support an emergency off switch (22).

32. Portable device as claimed in claim 31, wherein the at least one supporting web (86) supports a contact block (85) of the emergency off switch (22) in the interior of the housing (7) on walls thereof.

33. Portable device as claimed in claim 1, comprising a printed circuit board (16) of the control device (14) secured to a side of the frame (65) remote from the touch panel (58).

34. Portable device as claimed in claim 33, wherein the touch panel (58), the frame (65), the display (57) and the printed circuit board (16) of the control device (14) are suspended inside the housing (7) so that they float and cushion vibrations.

35. Portable device as claimed in claim 33, wherein the printed circuit board (16) is secured to the frame (65) without screws by means of a positive fixing means (81).

36. Portable device as claimed in claim 1, comprising electro-mechanical input elements (8) and/or a control element (10) mounted so that they can be selectively rotated on the top face (6) of the housing (7) about a vertical axis by 180°.

37. Portable device as claimed in claim 1, wherein the control device (14) is connected to the display (57), the touch panel (58), a displaceable control element (10), a safety switch device (12) and an emergency off switch (22) and has communication interfaces (17) to external control devices.

38. Portable device as claimed in claim 1, comprising input elements (8) in the form of a film key pad (9).

39. Portable device as claimed in claim 1, wherein the control device (14) has another interface and the housing (7) has a slot-shaped orifice (88) for receiving an interchangeable expansion card (89) conforming to the PCMCIA standard.

40. Portable device as claimed in claim 1, wherein the control device (14) is designed for running an existing standard operating system.

41. Portable device as claimed in claim 40, wherein the operating system is Windows CE™.

42. Portable device as claimed in claim 1, comprising user-defined screen masks and symbols presented on the display (57) to permit graphic-assisted operation.

43. Portable device as claimed in claim 1, comprising input and control elements (8, 10), all of which are disposed in recesses (39) on a top face (6) of the housing (7) and, when the housing (7) is set down on any surface, none of the input and control elements (8, 10) can be operated.

* * * * *